United States Patent [19]

Reim et al.

[11] Patent Number: 4,554,715

[45] Date of Patent: Nov. 26, 1985

[54] METHOD FOR THE FINISHING OF TEXTILE SHEETS

[75] Inventors: Ingeborg Reim, Cottbus; Gerhard Pohl, Forst; Wolfgang Götzke, Forst; Dieter Wahnberger, Forst; Lothar Postel, Forst; Irmgard Kindlein, Forst; Rudolf Vatter; Manfred Greschke, both of Cottbus, all of German Democratic Rep.

[73] Assignee: VEB Forster Tuchfabriken, Forst, German Democratic Rep.

[21] Appl. No.: 582,981

[22] Filed: Feb. 24, 1984

[51] Int. Cl.$^4$ ................................................ B32B 5/06
[52] U.S. Cl. .................................... 28/107; 26/29 R; 28/109; 428/91; 428/234; 428/300
[58] Field of Search ......................... 428/91, 234, 300; 26/29 R; 28/107, 109

[56] References Cited

U.S. PATENT DOCUMENTS

| | | | |
|---|---|---|---|
| 3,856,602 | 12/1974 | Colijn | 428/91 |
| 4,107,361 | 8/1978 | Parker | 428/91 |
| 4,183,985 | 1/1980 | Lemieux | 428/91 |
| 4,379,189 | 4/1983 | Platt | 428/91 |
| 4,425,392 | 1/1984 | Oikawa | 428/91 |

*Primary Examiner*—Marion E. McCamish
*Attorney, Agent, or Firm*—Jordan and Hamburg

[57] ABSTRACT

A method for the finishing of textile sheets, in which textile sheets for outer wear, upholstered furniture and car seat covers, as well as for decoration, preferably made of yarns having yarn strengths typical for carded yarns and/or worsted yarns (for example, ring yarns, OE-yarns, MJS yarns, friction yarns), are adjusted in a "custom-made" fashion, according to the sheet forming process. Textile sheet is supplied to a needling process alone, or together with the most varied sheets (for example, fleece, woven materials, foam materials, etc) or warps as well. Because of the needling process, by means of which the fibers are displaced from one layer into another with 50 to 1200 stitches per cm$^2$ by felting needles, preferably CB notched needles, there is a permanent layering which, however, for the production of sheets with naps, can be cut as well.

3 Claims, No Drawings

METHOD FOR THE FINISHING OF TEXTILE SHEETS

BACKGROUND OF THE INVENTION AND PRIOR ART STATEMENT

The invention relates to the finishing of textile sheets made of yarns having yarn strengths typical for carded yarns and/or worsted yarns, to be used for outer wear, upholstered furniture and car seat covers, as well as for decoration.

Methods are known, in which by means of multiple needling, large-meshed backings are felted with pre-strengthened fleeces into layer composites for technical textiles and floor coverings.

DE-OS No. 2522871 discloses that woven fabrics for furniture upholstery can be given a higher volume, raised effects, as well as an improved non-slip quality, by a multiple needling process.

The known methods are solely directed to either producing an independent sheet as layer composite, to volumizing the woven fabric, or to producing a nap-like surface.

SUMMARY OF THE INVENTION

It is an object of the invention to develop a finishing method, with which the textile sheet to be used for outer wear, upholstered furniture and car seat covers, as well as for decoration, can be adjusted in a "custom-made fashion" for various functions, preferably using yarns having yarn strengths typical for carded yarns and/or worsted yarns, according to the sheet formation process. Furthermore, the finishing process optionally and subsequently influences the sheet formation process, as well as the material composition, inner fiber/thread structure, coloring, surface structure and effect components. Additionally, optimum material hold-up and high productivity, because of process reduction (compared to conventional finishing methods, such as finishing, fulling, raising, embossing), or process substitution, is possible. The method enables the use of yarns, manufactured according to new, highly productive thread formation methods, to be used for fashionable outer wear, and for other purposes as well.

Thus it is another object of the invention to combine and to penetrate textile sheets to be used for outer wear, upholstered furniture, car seat covers, as well as for decoration, with yarns having yarn strengths typical for carded yarns and/or worsted yarns used to form the sheet to be finished, according to the sheet formation process, by needling with finishing areas, consisting of selected, unspun fiber materials and/or the material composition and pattern, of different or equal sheets or warps.

By this method, the textile-physical and clothing-physiological characteristics and/or the fashionable effects are changed, or directed towards specific functional characteristics, replacing or reducing generally required finishing processes.

These and other objects and advantages of the present invention will become evident from the description which follows.

DETAILED DESCRIPTION OF THE PREFERRED EMBODIMENTS

In summary, the invention relates to a method for the finishing of textile sheets, in which textile sheets for outer wear, upholstered furniture and car seat covers, as well as for decoration, preferably made of yarns having yarn strengths typical for carded yarns and/or worsted yarns (for example, ring yarns, OE-yarns, MJS-yarns, friction yarns) are adjusted in a "custom-made" fashion, according to the sheet forming process. Textile sheet is applied to a needling process alone, or together with the most varied sheets (for example, fleece, woven materials, foam materials, etc.), or warps as well. Because of the needling process, by means of which the fibers are displaced from one layer into another with 50 to 1200 stitches per $cm^2$ by felting needles, preferably CB notched needles, there is a permanent layering which, however, for the production of sheets with naps, can be cut as well.

Thus, the present invention is characterized by the provision of a method for the finishing of textile sheets or textile warps as sheets to be finished, preferably made of yarns having yarn strengths typical for carded yarn and/or from worsted yarns, used for outer wear, upholstered furniture, car seat covers or for decoration, in which the sheet to be finished is a sheet made of ring yarn or rotor (open-end) or MJS (Murata-Jet) or friction or sirospun yarn or a mixture of the abovementioned yarns, having one or several finishing areas, preferably fully covering the upper and/or bottom side, having a finishing area, consisting respectively of fiber materials in the form of a fleece of wool or fiber material mixtures, typical for carded yarn, with or without effect fibers, with or without interspersed color contrasting neps and/or kerns or flocks or disorderly thread patterns, or a textile sheet with the same or different material composition and/or pattern, as the sheet to be finished, or a fur imitation, or lining material, resulting in a layering, which is supplied as layering to at least one sheet to be finished, and to a finishing area of a known multiple needling device, and penetrated with 50 to 1200 stitches per $cm^2$ with felting needles, preferably CB notched needles, with the fibers brought along by the felting needles being displaced in the stitch direction from one layer into another, combining the layers, and/or the fibers being pushed out of the upper surface as a nap, up to the needle stitch height, with the displaced fibers of at least one sheet to be finished, and at least one finishing layer, permanently combining the layers, or being cut, forming a nap.

Generally, the surface measurement of a finishing area in the present method is smaller than, or equal to, the surface measurement of the sheet to be finished.

Typically, in a preferred mode, the displaced fibers, the connecting fibers between the sheet to be finished and finishing area, or between two sheets to be finished, are displaced by means of a two-sided needling process and cut at the area of fiber displacement, with the cut ends forming the fiber ends of the nap.

Typically, in a preferred mode, the dispersed effect fibers, or fibers from color contrasting neps, kerns or flocks, are pushed into the finishing surface, or the back-side of the sheet to be finished, by felting needles, preferably from the back-side, with a fiber portion being pushed in the stitch direction to the opposite side of the sheet to be finished, or the layering, and with the fiber portion not grasped by the needles being combined as remnant with the sheet to be finished by displaced fibers.

The objects are accomplished in that a textile sheet, made of yarns having yarn strengths typical for carded yarns and/or of worsted yarns, for example, rotor yarn or a warp from carded yarns, hereinafter called the sheet to be finished, is continuously pulled off a suitable, already known device.

The sheet to be finished is brought into contact with a finishing area, which is continuously supplied by known means, preferably covering the area in the same direction and generally at the same speed.

The finishing area can be an orderly or disorderly fiber material fleece, pre-strengthened or not pre-strengthened, and consisting, for example, of wool, such as wool which is difficult to spin or short-stapled, or of other fiber material mixtures, typical for carded yarns, and/or of worsted yarns, for example, rotor spun materials.

The finishing area, made of fiber fleece, can have effect fibers, such as mohair or kemp, or have color contrasting neps, slubs or flocks.

The finishing area can consist of an orderly or disorderly thread pattern.

The finishing area can, as regards the material composition and/or binding or pattern, be an equal or different textile sheet, like the sheet to be finished, for example fur imitation or lining material. The surface measurement of the supplied finishing area is equal to or smaller than the surface measurement of the sheet to be finished.

The supply of the finishing area can occur on the upper or bottom side, or on the upper and bottom side, of the sheet to be finished, possibly several times, preferably completely covering the upper and/or bottom side.

The result is a layered area, which can be moved without tension, or with varying tension of the layers, on a known multiple needling device, of a known one or two-sided needle felt machine.

By using a one or two-sided needle device of a known needle felt machine, there is a needling of the sheet to be finished at continuous withdrawal, with the finishing area or the layering. The needling is accomplished by felting needles, preferably with notched or hooked needles, at 50 to 1200 stitches per $cm^2$, possibly according to the pattern, with varying perforation depth and frequency.

Because of the needling, there is a displacement or insertion of the fiber material components, for example, native fiber materials and/or effect fibers or the fibers from prepared secondary raw materials, from the finishing areas into the sheet to be finished. Fiber material components are grasped by the movement of the hook or notch needles, and pulled along in the stitch direction.

With the notches pulling along fiber components from all penetrated layers or yarns, i.e., from the finishing areas and the sheets to be finished in the stitch direction, and with the stitch direction possibly being diametral, fiber ends or loops are distributed throughout the layers, partly far above the surface, in the stitch direction.

The desired effect can consist in:

(a) the enrichment of the sheets to be finished by fibers from the finishing area, for example, wool, effect fibers, changes in the coloring design, in the fiber/thread structure and voluminizing, as well as improvement of the non-slip quality, particularly with respect to thread patterns;

(b) the manufacture of nap effects, possibly with color contrasts or pattern-dependent nap length differences, without significant material losses and additional process steps;

(c) the connection of two different sheets, with effects as listed in (a) and/or (b);

(d) the concealing of defects in the sheets to be finished and/or;

(e) the connection of warps as sheets to be finished with finishing areas, for example, thread pattern or fleece with thread pattern, by combining the different fiber, thread or fiber/thread systems at the perforation points into independent sheets, with or without nap effect, and with high non-slip quality.

The fiber connections resulting from the fiber displacement from the finishing area into the sheet to be finished, and vice versa, can be cut. The result is a short, even nap on the cutting surface.

EXAMPLES

The invention will be further explained by the examples below:

Example 1

Webs to be finished from yarns having yarn strengths typical for carded yarns and/or worsted yarns, from rotor (open end) yarns, MJS (Murata-Jet) yarns, friction yarns or sirospun yarns, generally contain less than 50% wool. Higher percentages can be achieved only with large productivity losses, as regards the thread formation process. The conventional finishing of the upper surface (for example, by raising) is made more difficult by the specific thread construction, for example, the open-end or MJS yarns or sirospun yarns, because of the stomach binder or sugartop effect. Because of the stable, round yarn cross-section, and the low hairiness of these yarns, frequent raising processes are required, leading to high material losses. The raising process involves only the outer fibers of the yarns.

According to the present invention, additional wool is inserted from above or below, or from above and below, by means of needle felt machines, by subsequent multiple needling in the upper or bottom side, or the upper and bottom side. If the needle heads of the felting needles, preferably CB needles, completely penetrate the layering and project outside it, fiber ends are carried through the notch from the full yarn cross-section of the sheet to be finished, from the finishing area to the upper and/or bottom side. They partly project out of the sheet to be finished, forming a nap-like surface. The nap is the longer, the larger the stitch depth is, and the thicker, the more stitches there are per $cm^2$.

Example 2

According to the invention, it is possible for special purposes in extremely cold areas to connect the representative textile sheet for outer wear, as the web to be finished, by supplying a finishing area from a secondary raw material fleece, connecting it to the backside, without impairing the visible side.

In this case, the penetration depth of the CB notch needles does not extend beyond the surface of the sheet to be finished.

Example 3

According to the invention, the character of a known carded yarn-double woven fabric, generally having a strongly patterned, for example, checkered, back-side, can be accomplished in that two sheets, having different material composition, binding, pattern and color design, are put together as the sheet to be finished, and as finishing area, and exposed to a needling process from the back-side, with the needle points reaching the upper or visible side of the sheet to be finished. Assuming that a carded yarn sheet is used as the sheet to be finished, the finishing area can be a carded yarn structure as well, but also a synthetic sheet with fur character, or with lining character, as well. Possibly, a fleece from secondary raw material or foam material can be placed between the two sheets, according to the respective functional use.

Example 4

According to the invention, two equal carded yarn sheets are placed together, as the sheets to be finished, head-on with the upper or visible side. An aligned fiber material fleece of wool, with or without effect fiber material, or other preferably long-stapled fiber material, is supplied to the outer surfaces as finishing area. By means of a two-sided needling process, the fiber materials are penetrated from the finishing area, through a sheet to be finished, and into the second sheet to be finished, with the fiber materials from the sheets to be finished participating in the stitch direction of the needles, during the fiber displacement. If the two sheets are pulled apart by traction power following the needling process at an angle of up to 90% to the needle bed level, and cut at the fiber displacement, there is a short, even nap on both upper surfaces of the sheets to be finished, for example, with different colors or being a melange.

An equal sectible fiber penetration occurs, when a sheet to be finished serves as finishing area, and there is no fiber material fleece.

Example 5

According to the invention, warps typical for carded yarns, serving as the sheet to be finished, are combined with a fleece, serving as finishing area, on which an orderly thread pattern is located, at an angle of 10° to 170° to the longitudinal direction of the finishing area, or a disorderly thread pattern. If the sheet and the area are exposed to a needling of 100 to 500 stitches per cm$^2$, there are fiber displacements from one thread system into another, particularly in the area of crosswebs, so that there is a connection of the warp with the thread pattern. By this connection and additional fiber displacement from the fleece, the result is a firm textile sheet for outer wear.

Example 6

According to the invention, effect fibers in the form of neps, slubs, flocks, and/or kemps are interspersed by a well-known device on the back-side of sheets to be finished, originating from threads which are difficult to spin together with effect fibers, or which contain no effect fibers. Thereafter, the sheet is supplied to a needling device, and penetrated from the bottom side, so that the effect fibers are bound into the sheet predominantly in the stitch direction, and pulled out, more or less far out, of the upper or visible side of the sheet to be finished, depending on the penetration depth. Depending on the stitch frequency, large remnants of the neps, slubs or flocks remain visible on the backside, forming, for example, color effects.

It thus will be seen that there is provided a method for the finishing of textile sheets, and an improved product finished textile sheet as an article of manufacture, which attain the various objects of the invention, and which are well adapted for the conditions of practical use. As numerous alternatives within the scope of the present invention, besides those alternatives, variations, embodiments and equivalents mentioned supra, will occur to those skilled in the art, it will be understood and appreciated that the present invention is to be limited only by the scope and content of the recitations in the appended claims, and functional and structural equivalents thereof.

We claim:

1. Method of producing a fabric comprising feeding to a multiple needling device having closed barbed felting needles the following two materials (a) and (b), (a) a textile web comprising a fabric or array of warp yarns constituted of at least one of rotor-spun yarns, Murata jet-spun yarns, friction-spun yarns, and sirospun yarns and (b) overlying at least a portion of a surface of the textile web a textile of fiber material comprising at least one of a fleece, effect fibers, effect fiber bundles, an array of disordered fibers, a textile sheet, imitation fur and fabric lining material, needling the resultant superimposed layers (a) and (b) from the side of the textile or fiber material (a) by means of the multiple needling device, the needling comprising projecting the needles first into the textile or fiber material (a) so that portions of the fibers thereof are engaged by the needles, then projecting the needles into and through the textile or fiber material (b) so that some fibers from the textile or fiber material (b) are carried together with fibers of the textile web (a) onto the surface of the textile web (a) thereby connecting together the textile web (a) and the textile or fiber material (b) and forming a surface overlying the textile web (a) and constituted of a mixture of fibers and yarns of textile web (a) and textile or fiber material (b).

2. Method according to claim 1, further comprising cutting said surface fibers and yarns to form a nap.

3. Method according to claim 2, in which the spun yarns of textile web (a) are not spinnable with, and, therefore, do not include, effect fibers or effect fiber bundles, and the fiber material (b) consists of effect fibers or effect fiber bundles, whereby the resultant surface overlying the textile web (a) is constituted of a mixture of effect fibers or effect fiber bundles and fibers or yarns of textile web (a).

* * * * *